Oct. 3, 1939.  A. F. DITTMER  2,174,917
OPHTHALMIC LENS SYSTEM
Filed Feb. 24, 1938

ARTHUR F. DITTMER
INVENTOR.
ATTORNEYS

Patented Oct. 3, 1939

2,174,917

UNITED STATES PATENT OFFICE 2,174,917

OPHTHALMIC LENS SYSTEM

Arthur F. Dittmer, Rochester, N. Y., assignor to Bausch & Lomb Optical Company, Rochester, N. Y., a corporation of New York Application February 24, 1938, Serial No. 192,228

2 Claims. (Cl. 88—54)

The present invention relates to compound lens systems and more particularly to mounts for compound ophthalmic lens systems.

Compound ophthalmic lens systems such as telescopes, both magnifying and minifying, and microscopes, are well known but their weight and unsightliness have largely restricted their use. Furthermore, such systems have been very difficult to make and assemble, so that the cost has been another factor restricting the use of such lens systems.

One of the objects of the present invention is to provide a compound ophthalmic lens system which is simple and inexpensive in construction and light in weight. Another object is to provide such a lens system which is not unsightly in appearance. A further object is to provide a compound ophthalmic lens system which can be easily and quickly produced and assembled in the average optical prescription shop. These and other objects and advantages reside in certain novel features of construction, arrangement and combination of parts as will hereinafter be more fully set forth and pointed out in the appended claims.

Referring to the drawing.

Figure 1:
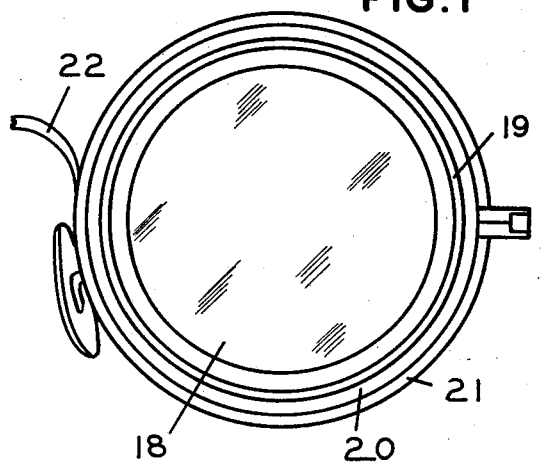
Fig. 1 is a front elevation of a spectacle lens system embodying the present invention.
Figure 2:
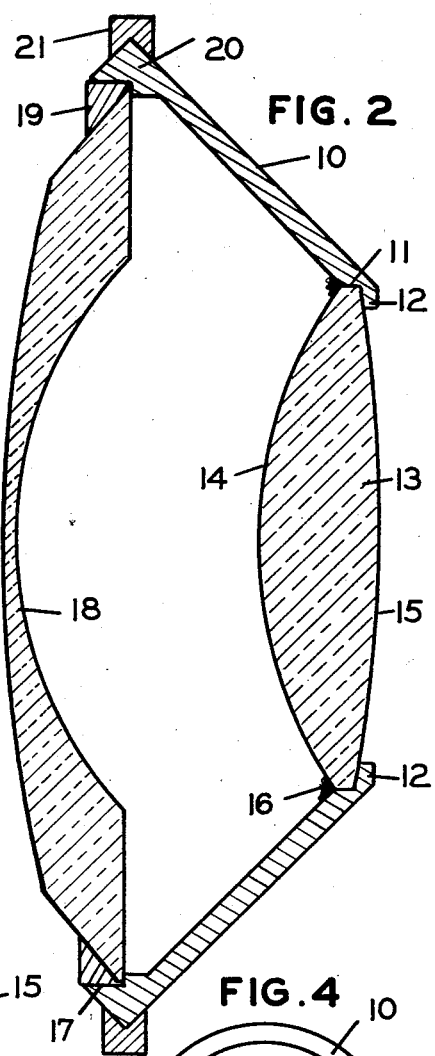
Fig. 2 is an enlarged vertical section thereof.

One embodiment of my invention is illustrated in Figs. 1 to 4 wherein 10 designates an annular lens carrier for holding the elements of a compound lens system. This carrier is shown as frusto-conical in shape but obviously it can have the shape of the frustum of a pyramid or a zone of a surface of revolution. The term frusto-conical in the claims is intended to include the other equivalent forms. This carrier is preferably made of a transparent or translucent synthetic resin such as cellulose acetate or nitrate or one of the methacrylate resins. These substances are light and strong and their transparency helps to make the carrier less visible thus improving the appearance of the lens systems. Obviously, however, other substances can be used.

The small end of the carrier 10 has a cylindrical bore 11 forming a lens cell or seat and two flange portions 12 extend inwardly at the end of the bore 10. The lens system illustrated in the drawing is a minifying telescope and in such a system, the rear lens 13 is a positive element. The front surface 14 of the lens 13 is spherical and any necessary cylindrical correcting power is ground on the rear surface 15. The lens 13 is preferably placed in the seat or bore 11 so that the meridian having the strongest curve, rests on the flange portions 12. A small amount of cement 16 about the edge of the lens 13 serves to hold it in the seat 11.

A second bore 17 at the large end of the carrier 10, forms a second lens cell or seat substantially parallel to the lens cell or seat 11. A second lens 18 is located in the seat 17 and is held in position by a ring 19 which is preferably of the same material as the carrier 10. This ring 19 is cemented in the cell 17 and thus rigidly secures the lens 18 in position.

The carrier 10 has an outward projection 20 in the form of a bevel which can be secured in the rim 21 of an ophthalmic mounting 22.

Figure 5:
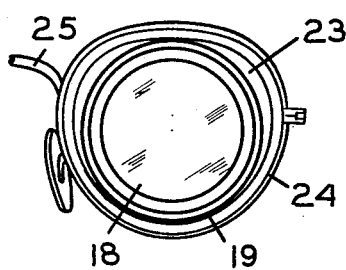
Fig. 5 is a front elevation of a modification.
Figure 6:
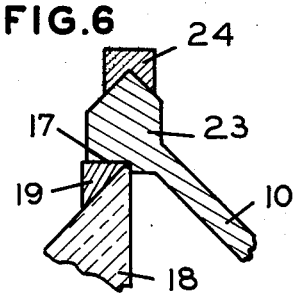
Fig. 6 is an enlarged fragmentary section showing the edge structure of the modification shown in Fig. 5.
Figure 3:
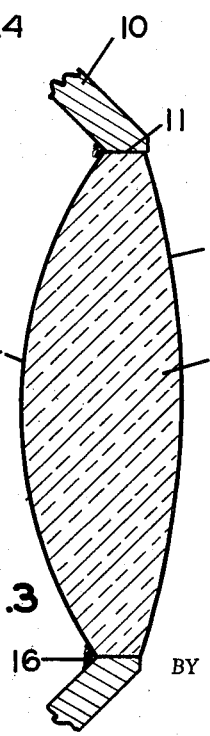
Fig. 3 is an enlarged fragmentary horizontal section of the rear lens mount.
Figure 4:
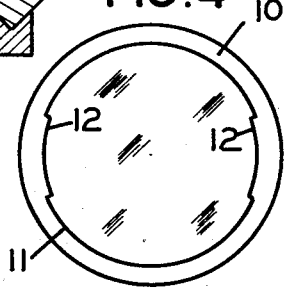
Fig. 4 is a rear elevation of the lens system.

In the modification shown in Figs. 5 and 6, the projection 23 extends outwardly as a flat ring. This ring can be edged to any desired size or shape and can be secured in the rim 24 of a suitable ophthalmic mounting 25. Fig. 5 shows the lens system made in the drop oval shape but, obviously, other shapes and sizes can be used.

One of the chief advantages of the present invention lies in the ease with which these compound lens systems can be assembled in the average optical prescription shop. The manufacturer will furnish to the prescription shop a set including a number of carriers 10 and rings 19 and sets of unmounted lenses 13 and 18. These lenses 13 and 18 will be of various powers to give predetermined standard magnifications or minifications.

The lens 13 will be furnished unfinished on the rear surface 15 and when the prescription shop receives an order for one of these compound lens systems, the proper lenses 13 and 18 are selected to give the prescribed magnification or minification. This magnification or minification is determined from the power of the lens 18 and the power of the front surface 14 of the lens 13. Any additional prescription power spherical or toric is then ground on the rear surface 15 of the lens 13 in accordance with a table furnished by the manufacturer. The surface 15 is preferably formed with a long radius of curvature so that the desired prescription curve can be ground with the tools ordinarily found in a prescription shop.

From the foregoing, it will be apparent that I am able to attain the objects of my invention and provide a compound ophthalmic lens system which is simple in construction yet light and durable and which is not unsightly in appearance. While I have illustrated my invention in connection with a minifying system, such as is used on aphakic eyes, obviously, it is equally applicable to other compound lens systems such as telescopes or microscopes. Various modifications can, of course, be made without departing from the spirit of my invention or the scope of the appended claims.

I claim:

1. A compound ophthalmic lens assembly comprising a frusto-conical annular ring, a lens seat at the small end of said ring terminating at an inward flange, a lens adapted to fit in said lens seat, means for securing said lens in said seat, a second lens seat at the large end of said ring substantially parallel to the first-named lens seat, a second lens adapted to fit in the second lens seat, a retaining ring adapted to fit in the second lens seat to hold the second lens in said seat, means for securing said retaining ring in said seat, an outwardly projecting flange at the large end of said frusto-conical ring and means for securing an ophthalmic mounting on said flange projection.

2. A compound ophthalmic lens assembly comprising a frusto-conical annular ring of translucent material, a lens seat at the small end of said ring terminating at an inward flange, a lens adapted to fit in said lens seat, means for securing said lens in said seat, a second lens seat at the large end of said ring substantially parallel to the first-named lens seat, a second lens adapted to fit in the second lens seat, means for securing the second lens in the second lens seat, an outward flange adjacent the large end of the frusto-conical ring and means for attaching an ophthalmic mounting on said outward flange.

ARTHUR F. DITTMER.